United States Patent Office 3,503,982
Patented Mar. 31, 1970

3,503,982
2,2-DIMETHYL-6,6 DISUBSTITUTED-4-SUBSTITUTED AMINOPIPERIDINE-1-OXIDES
Keisuke Murayama, Syoji Morimura, Toshimasa Toda, and Tomizi Tsuzi, Tokyo, Japan, assignors to Sankyo Company Limited, Tokyo, Japan
No Drawing. Filed Nov. 25, 1966, Ser. No. 596,755
Claims priority, application Japan, Aug. 24, 1966, 41/55,972
Int. Cl. C07d 29/26
U.S. Cl. 260—293                13 Claims

---

ABSTRACT OF THE DISCLOSURE

Novel piperidine N-oxides exhibiting a stabilizing effect against photo deterioration of polyolefins.

---

This invention relates to certain novel piperidine N-oxides and a process for preparing the same.

More particularly, it relates to a new class of piperidine N-oxides having the formula

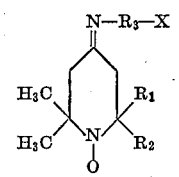

(I)

wherein $R_1$ and $R_2$ may be the same or different and individually represent alkyl group or jointly, together with the carbon atom to which they are attached, form a 5–7-membered cycloalkyl ring; $R_3$ represents alkylene group, cycloalkylene group with a 5–7-membered ring, arylene group which may be optionally substituted with alkyl, alkoxy or amino in the aryl moiety, arylene-amino group or arylene-diamino group; and X represents hydrogen atom or the group

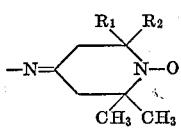

in which $R_1$ and $R_2$ have the aforesaid meanings. Also, it relates to a novel process for preparing the above piperidine N-oxides (I).

The piperidine N-oxides (I) of this invention are novel compounds unknown in the prior art and they exhibit excellent stabilizing effect against photo-deterioration of polyolefins, including, for example, polyethylene, polypropylene, other polyolefins such as polybutadiene and olefin copolymers such as ethylene-propylene copolymers, styrene-butadiene copolymers and acrylonitrile-butadiene-styrene copolymers. Thus, these novel piperidine N-oxides are useful as a light stabilizer.

It is, therefore, an object of this invention to provide novel piperidine N-oxides of the above Formula I which are useful as a stabilizer for polyolefins against deterioration resulting from exposure to light.

Another object of this invention is the provision of a novel process for the preparation of such new and useful piperidine N-oxides.

Other objects of this invention will be apparent from the following detailed description of this invention.

In the definition of the substituents $R_1$ and $R_2$, typical radicals are those;

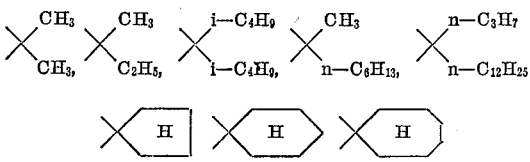

In the definition of the radical $R_3$, typical radicals are those;

$-CH_2-$, $-CH_2-CH_2-CH_2-$,
$-(CH_2)_6-$, $-(CH_2)_8-$

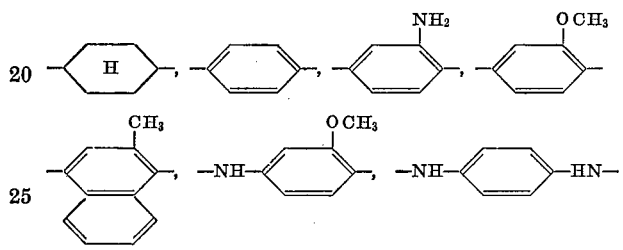

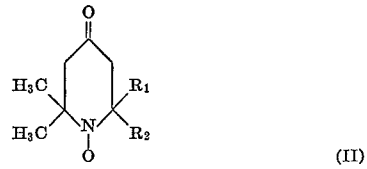

In accordance with this invention, the present piperidine N-oxide (I) can be prepared by reacting the piperidone N-oxide having the formula

(II)

wherein $R_1$ and $R_2$ have the aforesaid meanings with the amine derivative having the formula $$H_2N-R_3-Y \quad \text{(III)}$$

wherein $R_3$ has the aforesaid meanings and Y represents hydrogen atom or amino group.

In carrying out the process of this invention, the reaction may be satisfactorily carried out by reacting a compound of the above Formula II with a compound of the above Formula III in a suitable solvent, such as water, methanol, ethanol, benzene, toluene and the like at room temperature or by heating under reflux a mixture of a compound of the above Formula II and a compound of the above Formula III in a suitable water-immiscible organic solvent, such as benzene, toluene and the like. Where heating is employed in the reaction, it is preferable to carry out the reaction while continuously removing the water formed during the reaction, by means of a conventional equipment suitable for such purpose. Also, it may be desirable in the process of this invention to employ a conventional condensation catalyst such as acetic acid, ammonium acetate and the like.

After completion of the reaction, the reaction product may be conveniently and satisfactorily recovered and purified from the reaction mixture by a conventional means, for instance, filtration, extraction, recrystallization or a combination thereof.

In the process of this invention, where the compound of the above Formula III in which Y stands for amino group is to be employed as a reagent, the mole ratio of the compounds (II) to (III) is preferably in the range of 2:1 and there is produced the desired product of the above Formula I in which X stands for the group

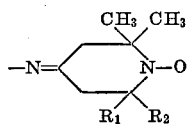

($R_1$ and $R_2$ have the aforesaid meanings). On the other hand, where the compound of the above Formula III in which Y stands for hydrogen atom is to be employed as a reagent, the mole ratio of the compounds (II) to (III) is preferably in the range of 1:1 and there is produced the desired product of the above Formula I in which X stands for hydrogen atom.

Thus, one embodiment of the process of this invention comprises reacting the piperidine N-oxide of the above Formula II with the amine derivative of the above Formula III wherein Y stands for amino group to produce the piperidine N-oxide of the above Formula I wherein X stands for the group

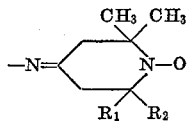

in which $R_1$ and $R_2$ have the aforesaid meanings. Another embodiment of the process of this invention comprises reacting the piperidine N-oxide of the above Formula II with the amine derivative of the above Formula III wherein Y stands for hydrogen atom to produce the piperidine N-oxide of the above Formula I wherein X stands for hydrogen atom.

Representative examples of the present piperidine N-oxides (I) include the following:

2,2,6,6 - tetramethyl-4-n-butylimino - piperidine-1-oxide (B.P. 113–114° C./1 mm. Hg);

2,2,2,6,6-tetramethyl - 4 - cyclohexylimino-piperidine-1-oxide (M.P. 123–125° C.);

2,2,6,6-tetramethyl - 4 - $\beta$ - naphthyl iminopiperidine-1-oxide (M.P. 93–95° C.);

2,2,6,6-tetramethyl-4-(p-methoxy - phenylimino)-piperidine-1-oxide (B.P. 166–169° C./0.1 mm. Hg);

2,2,6,6-tetramethyl-4-(p-tolylimino) - piperidine-1-oxide (M.P. 111.5–113° C.);

2,2,6,6-tetramethyl-4-(p-tolylhydrazono) - piperidine-1-oxide (M.P. 90–91° C.);

2,2,6,6-tetramethyl - 4 - (O-aminophenylimino)-piperidine-1-oxide (M.P. 163–164° C.);

1-aza-2,2-dimethyl-4-n-butylimino-spiro[5,5] undecane-1-oxide (B.P. 95–96° C./0.003 mm. Hg);

N,N'-bis (2,2,6,6-tetramethyl-4-piperidylidene-1-oxide) ethylenediamine (M.P. 195° C.);

N,N'-bis (2,2,6,6-tetramethyl-4-piperidylidene-1-oxide) hexamethylenediamine;

N,N'-bis (2,2,6,6-tetramethyl-4-piperidylidene-1-oxide) p-phenylenediamine (M.P. 238° C. with decomposition);

and 2,2,6-trimethyl-6-n-hexyl-4-n-butyl-iminopiperidine-1-oxide (B.P. 108–109° C./0.1 mm. Hg).

The compounds of the above Formula II which are employed as a starting material in the process of this invention are novel compounds with exception of 2,2,6,6-tetramethyl-4-oxopiperidine-1-oxide and these novel compounds may be easily obtained by a process which involves reaction of diacetone alcohol with a suitable ketone and ammonia in the presence of a Lewis acid to produce the corresponding piperidone derivative followed by treatment of the latter with a suitable peroxide such as hydrogen peroxide or an organic peracid, as being illustrated by the following reaction schema.

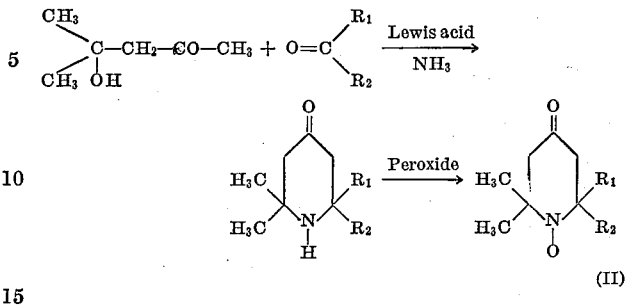

The following examples are given only for the purpose of illustration of this invention and should not be construed to be limiting the scope thereof.

EXAMPLE 1

Preparation of N,N'-bis(2,2,6,6-tetramethyl-4-piperidylidene-1-oxide)ethylenediamine A solution of 8.4 g. of 2,2,6,6-tetramethyl-4-oxopiperidine-1-oxide and 1.5 g. of ethylenediamine in 60 ml. of benzene was heated under reflux for 7 hours, while stirring and continuously removing the water formed during the reaction proceeding. After cooling, the crystalline material which precipitated was recovered by filtration and recrystallized from ethanol to give the desired product, melting at 195° C. with decomposition.

Analysis.—Calculated for $C_{20}H_{36}O_2N_4$ (percent): C, 65.89; H, 9.95; N, 15.36. Found (percent): C, 65.67; H, 10.14; N, 15.19.

EXAMPLE 2

Preparation of 1-aza-2,2-dimethyl-4-n-butyliminospiro [5,5] undecane-1-oxide

A solution of 7.4 g. of 1-aza-2,2-dimethyl-4-oxo-spiro [5,5] undecane-1-oxide and 3.0 g. of n-butylamine in 60 ml. of benzene was heated under reflux for 14 hours while stirring and continuously removing the water formed during the reaction proceeding. Thereafter, the reaction mixture was subjected to distillation under reduced pressure to give the desired product, boiling at 95–96° C./0.003 mm. Hg.

Analysis.—Calculated for $C_{16}H_{29}ON_2$ (percent): C, 72.40; H, 11.01; N, 10.56. Found (percent): C, 72.21; H, 10.93; N, 10.48.

EXAMPLE 3

Preparation of 2,2,6,6-tetramethyl-4-cyclohexyliminopiperidine-1-oxide

The same procedure as in Example 2 was repeated except that there was employed a solution of 6.0 g. of 2,2,6,6-tetramethyl-4-oxo-piperidine-1-oxide, 4.0 g. of cyclohexylamine in 80 ml. of benzene, thereby to give the crude crystalline material. The material thus obtained was recrystallized from petroleum-benzene to give the desired product, melting at 123–125° C.

Analysis.—Calculated for $C_{15}H_{27}ON_2$ (percent): C, 71.60; H, 10.82; N, 11.14. Found (percent): C, 71.37; H, 10.67; N, 11.25.

EXAMPLE 4

Preparation of 2,2,6,6-tetramethyl-4-(p-methoxyphenylimino) piperidine-1-oxide

A solution of 5 g. of 2,2,6,6-tetramethyl-4-oxopiperdine-1-oxide, 4 g. of p-anisidine, 70 ml. of benzene and 1 ml. of acetic acid was heated under reflux for 6 hours, while stirring and continuously removing the water formed during the reaction proceeding. Thereafter, the reaction mixture was washed successively with 5% aqueous sodium carbonate and water, dried over anhydrous sodium sulfate, and then subjected to distillation under reduced pressure to give the desired product, boiling at 166–169° C./0.1 mm. Hg.

*Analysis.*—Calculated for $C_{16}H_{23}O_2N_2$ (percent): C, 69.79; H, 8.42; N, 10.17. Found (percent): C, 69.58; H, 8.61; N, 10.03.

EXAMPLE 5

Preparation of 2,2,6,6-tetramethyl-4-β-naphthylimino-piperidine-1-oxide

The same reaction procedure as in Example 1 was repeated except that 5 g. of 2,2,6,6-tetramethyl-4-oxopiperidine-1-oxide and 4.3 g. of β-naphthylamine were employed and refluxing was continued for 17 hours. Thereafter, the crystalline material which precipitated was recrystallized from benzene to give the desired product, melting at 93–95° C.

*Analysis.*—Calculated for $C_{19}H_{23}ON_2$ (percent): C, 77.25; H, 7.85; N, 9.48. Found (percent): C, 77.07; H, 8.02; N, 9.19.

EXAMPLE 6

Preparation of N,N'-bis(2,2,6,6-tetramethyl-4-piperidylidene-1-oxide)-p-phenylenediamine The same reaction procedure as in Example 1 was repeated except that 5 g. of 2,2,6,6-tetramethyl-4-oxopiperidine-1-oxide and 1.6 g. of p-phenylenediamine were employed and refluxing was continued for 22 hours. Thereafter, the crystalline material which precipitated was recrystallized from ethanol to give the desired product, melting at 238° C. with decomposition.

*Analysis.*—Calculated for $C_{24}H_{36}O_2N_4$ (percent): C, 69.87; H, 8.80; N, 13.58. Found (percent): C, 69.67; H, 8.97; N, 13.34.

EXAMPLE 7

Preparation of 2,2,6,6-tetramethyl-4-p-tolylhydrazono-piperidine-1-oxide

To 2 g. of 2,2,6,6-tetramethyl-4-oxo-piperidine-1-oxide was added a solution of 1.9 g. of p-tolylhydrazine hydrochloride and 1.2 g. of sodium acetate in 50 ml. of water. The resulting mixture was stirred at room temperature for 10 hours. Thereafter, the reaction mixture was extracted several times with benzene. The combined extracts were washed with water, dried over anhydrous sodium sulfate and then the solvent was distilled off. Recrystallization of the residue from petroleum benzene gave the desired product, melting at 90–91° C.

*Analysis.*—Calculated for $C_{16}H_{24}ON_3$ (percent): C, 70.02; H, 8.81; N, 15.31. Found (percent): C, 70.25; H, 8.85; N, 15.12.

What is claimed is:

1. A compound having the formula

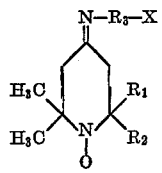

wherein $R_1$ and $R_2$ are the same or different and individually represent alkyl of from 1 to 12 carbon atoms or jointly, together with the carbon atom to which they are attached, form a 5–7-membered cycloalkyl ring; $R_3$ represents alkylene of from 1 to 8 carbon atoms, cycloalkylene with a 5–7-membered ring, phenylene, naphthylene, a phenylene or naphthylene group substituted with alkyl of 1 to 4 carbon atoms, alkoxy of 1 to 4 carbon atoms or amino, phenylene-amino, naphthylene-amino, phenylene-diamino or naphthylene-diamino; and X represents hydrogen atom or the group

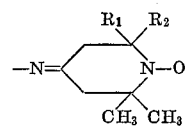

in which $R_1$ and $R_2$ are as defined above.

2. 2,2,6,6-tetramethyl-4-n-butyliminopiperidine-1-oxide.
3. 2,2,6,6 - tetramethyl-4-cyclohexyliminopiperidine-1-oxide.
4. 2,2,6,6 - tetramethyl-4-β-naphthyliminopiperidine-1-oxide.
5. 2,2,6,6 - tetramethyl - 4 - (p-methoxyphenylimino) piperidine-1-oxide.
6. 2,2,6,6 - tetramethyl - 4-(p-tolylimino)piperidine-1-oxide.
7. 2,2,6,6 - tetramethyl-4-(p-tolylhydrazono)piperidine-1-oxide.
8. 2,2,6,6 - tetramethyl-4-(o-aminophenylimino)piperidine-1-oxide.
9. 1-aza - 2,2 - dimethyl-4-n-butyliminospiro [5,5] undecane-1-oxide.
10. N,N' - bis(2,2,6,6 - tetramethyl-4-piperidylidene-1-oxide)ethylenediamine.
11. N,N' - bis(2,2,6,6 - tetramethyl-4-piperidylidene-1-oxide)p-phenylenediamine.
12. N,N' - bis(2,2,6,6 - tetramethyl-4-piperidylidene-1-oxide)hexamethylenediamine.
13. 2,2,6 - trimethyl - 6 - n-hexyl-4-n-butyliminopiperidine-1-oxide.

References Cited

Rozantsev et al. Tetrahedron, 1964, vol. 20, pp. 131–7 (pages 133–4 relied upon).

HENRY R. JILES, Primary Examiner

G. THOMAS TODD, Assistant Examiner

U.S. Cl. X.R.

260—45.8, 294.7